United States Patent [19]

Schoch

[11] 4,151,897

[45] May 1, 1979

[54] BICYCLE WHEEL RIM BRAKE

[75] Inventor: Robert Schoch, Singen, Hohentwiel, Fed. Rep. of Germany

[73] Assignee: Weinmann GmbH. & Co. KG., Singen/Hohentwiel, Fed. Rep. of Germany

[21] Appl. No.: 832,627

[22] Filed: Sep. 12, 1977

[30] Foreign Application Priority Data

Sep. 16, 1976 [DE] Fed. Rep. of Germany ......... 762891

[51] Int. Cl.² .............................................. B60L 1/00
[52] U.S. Cl. ..................................... 188/24; 85/9 R; 85/55; 188/72.9
[58] Field of Search ....................... 188/24, 25, 26, 27, 188/344, 72.9; 85/1 P, 9 R, 42, 55

[56] References Cited

U.S. PATENT DOCUMENTS

| 3,628,635 | 12/1971 | Yoshigai | 188/24 X |
| 3,983,968 | 10/1976 | Weinmann | 188/24 |
| 4,009,768 | 3/1977 | Fujii | 188/24 |

FOREIGN PATENT DOCUMENTS

| 562459 | 9/1923 | France | 188/24 |
| 1281713 | 12/1961 | France | 85/55 |
| 618169 | 2/1961 | Italy | 85/55 |
| 284980 | 8/1952 | Switzerland | 188/24 |
| 365960 | 1/1963 | Switzerland | 188/26 |
| 750894 | 6/1956 | United Kingdom | 85/9 R |

Primary Examiner—George E. A. Halvosa
Attorney, Agent, or Firm—Ernest F. Marmorek

[57] ABSTRACT

A caliper brake has stirrups mounted on a shaft that is connected to, though turnable on, the bicycle frame. A retaining device keeps the stirrup on the shaft, and an apertured cap surmounts the retaining device. The shaft can be turned by a wrench that reaches through the aperture of the cap to engage the shaft end.

8 Claims, 3 Drawing Figures

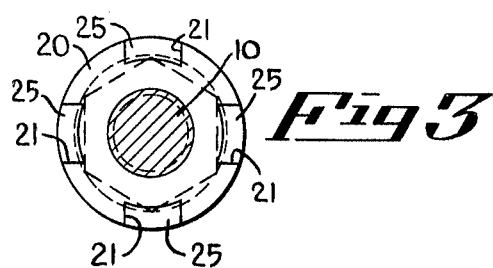
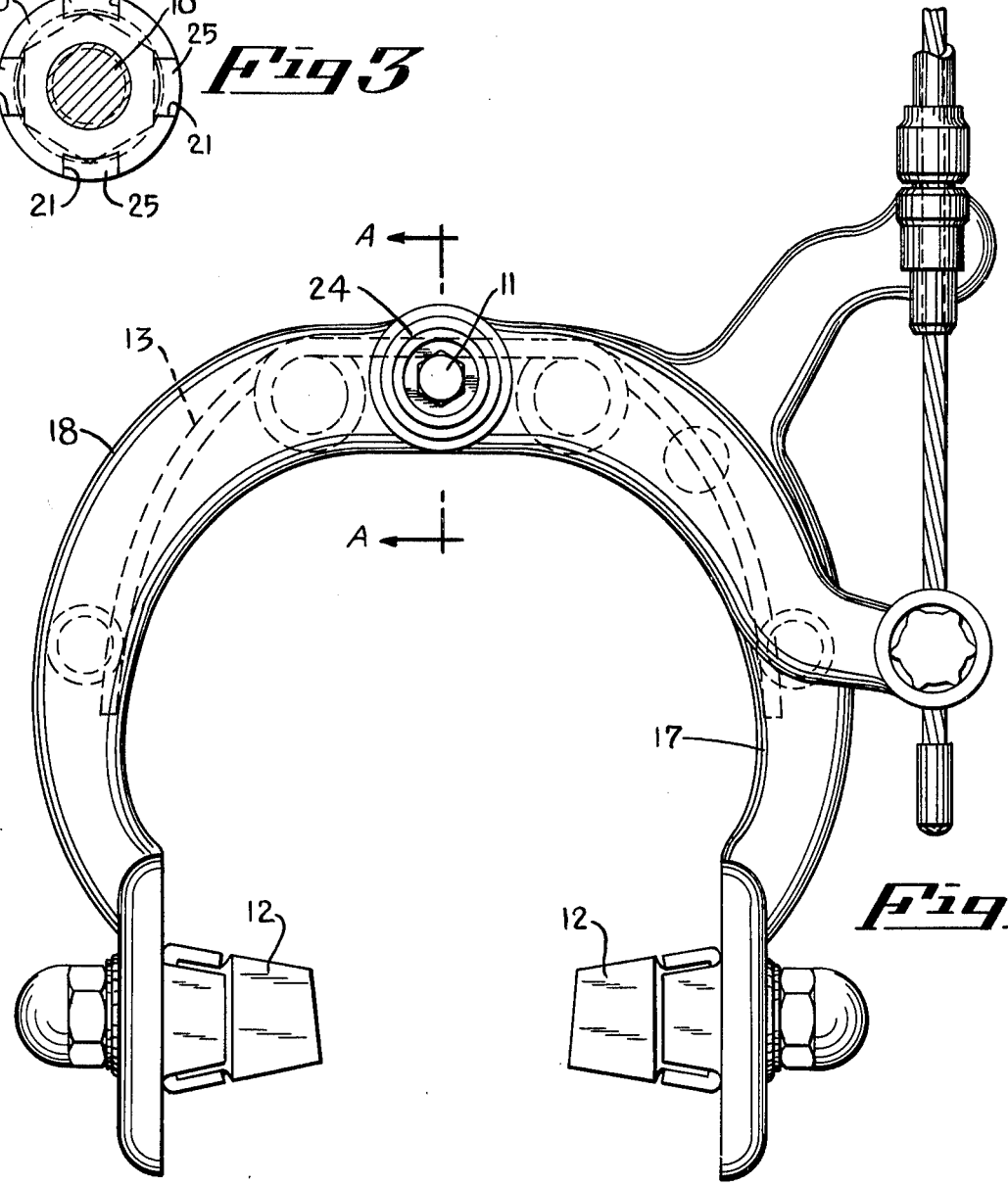
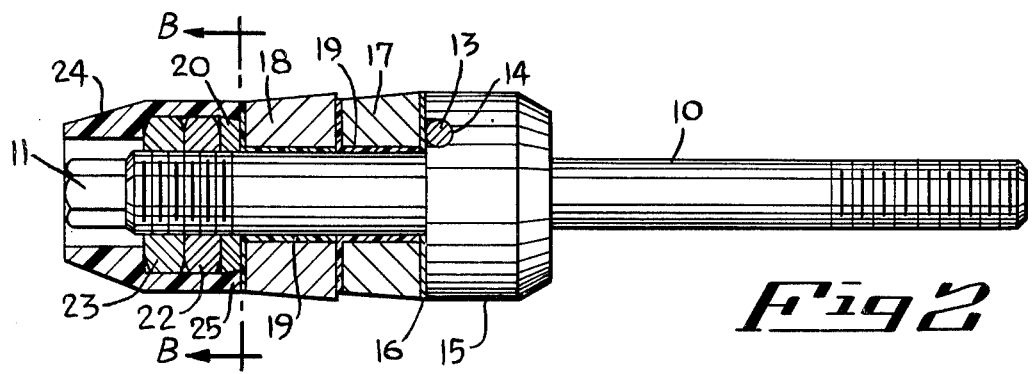

BICYCLE WHEEL RIM BRAKE

BACKGROUND OF THE INVENTION

A caliper brake for the rim of a bicycle brake is known, wherein the brake has a shaft and two brake stirrups mounted on a shaft.

In caliper brakes for bicycles it is necessary to mount the brake near the wheel so that the distance of the two stirrups from the two sides of the rim is substantially the same, thus allowing the stirrups to make contact with both sides of the wheel rim substantially simultaneously during braking.

It is therefore necessary that the brake assembly be rotatable about the axis of a shaft that is mounted on the frame of the bicycle without the parts of the brake coming apart.

The majority of caliper brakes do not permit such an adjustment. A commercially available device permits such rotation by means of at least two surfaces on spring holding means, the surfaces being adjustable by a fork spanner. The accessibility of the fork spanner on the front wheel, however, particularly in a frame having a large now quite popular bearing box, leaves much to be desired.

SUMMARY AND OBJECTS OF THE INVENTION

It is one of the objects of the present invention to overcome the disadvantages of the prior art; it is another object of the present invention to obtain free access to a free end of the brake assembly, so that the whole brake assembly may be rotated by means of a tool, such as a wrench, engaging the accessible free wrench receiving facted end of the shaft so as to center the brake shoes with respect to the rim sides of the bicycle wheel.

BRIEF DESCRIPTION OF THE DRAWING

The present invention will be better understood with the aid of the accompanying drawings, in which:

FIG. 1 is an elevational view of the caliper brake;

FIG. 2 is a large scale sectional view taken on the line A—A of FIG. 1; and

FIG. 3 is a sectional view taken on the line B—B of FIG. 2.

DESCRIPTION OF THE PREFERRED EMBODIMENTS

In carrying the invention into effect, a shaft 10 is mounted on the frame of a bicycle. The term frame as used herein includes all the parts of the bicycle chassis that are supported by the two wheels, thus the main frame that is supported at the rear by the rear wheel and the bifurcated front frame that is supported by the front wheel end in turn supports the front of the main frame. The frame is not shown.

The shaft 10 includes wrench receiving means, such as a multifaceted prismatic end portion 11 near the outer end.

At least a portion of the shaft 10, that includes the end portion 11 and the free shaft end, can be turned about the shaft axis together with the entire brake assembly that is mounted on that turnable shaft portion. Thus, the end portion 11 with its plurality of faces can be engaged by a conventional wrench (not shown) so that the brake assembly may thereby be turned in its entirety about the longitudinal axis of the shaft 10, to adjust it to a symmetrical position in which the brake shoes 12 are spaced equidistantly from the rim of the bicycle wheel. The terms wrench and wrench receiving means include all applicable conventional inter-engaging forms for the purpose of rotating of one by the other, such as slot and screw driver, the "Allen" type, and the multi-faceted type, and others of similar nature.

When assembling the brake, a spring 13 which may for example be a helical spring or a torsion spring, is initially inserted into a groove 14 of the collar 15. The spring serves to keep the stirrups apart when the brake is inactive.

Then a metal disc 16 and stirrups 17 and 18 are slid onto the shaft 10, the stirrups being preferably supported on bushings 19 made of synthetic plastic material. This is being followed by mounting a supporting disk 20 having a plurality of recesses 21 on the periphery, on the shaft 10; a securing nut 22 is then screwed onto a threaded portion of the shaft 10, followed by threading a retaining nut 23 onto the threaded portion of the shaft 10 to restrain the securing nut 22 from becoming loose.

The axial play of the braking stirrups 17 and 18 is adjusted by means of the securing nut 22, the retaining nut 23 restraining any undesired movement of the securing nut 22. Finally, a cap 24 made of synthetic plastic material is slid onto the shaft 10; it has an aperture near the free end of the shaft 10. The cap 24 is formed with projections 25, which snap into respective recesses 21 of the supporting disk 20. The cap 24 covers any projecting parts of the end of the shaft 10, thus preventing any possible injury of an operator of the bicycle, and complying with some existing safety requirements. The brake assembly may now be easily pivoted by means of a wrench engaging through the aperture of the cap 24 at the end portion 11, as the end portion 11 is easily accessible.

The brake stirrups 17 and 18 are interconnected in a conventional fashion, by a cable 27 and an end stop 28 of a Bowden central system type. The brake shoes 12 are mounted, respectively, in a conventional manner on the brake stirrups or guards 17 and 18.

Having thus described the invention, what I claim as new and desire to be secured by Letters Patent, is as follows:

1. In a caliper brake, for use in braking a rimmed wheel, journalled on the frame of a bicycle, a brake assembly.

comprising in combination:

a longitudinal shaft mounted on said frame, at least a portion of said shaft including a free shaft end being rotatable about the longitudinal shaft axis, said shaft including wrench engaging means near said free and accessible from the exterior, two brake stirrups pivotably mounted near each other on said portion of said shaft, normally angularly spaced apart from each other sufficiently to clear the wheel when the brake is not applied, actuatable to move angularly toward each other about the shaft axis for braking, and exerting pressure against the shaft portion sufficient to generate frictional interengagement between the stirrups and the shaft portion for rotation of both stirrups with the shaft portion for substantially symmetrical positioning of the stirrups relative to the rimmed wheel when the shaft portion is rotated, and restraining means for restraining the movement of the brake stirrups in an axial direction but providing an axial play sufficient for the individual movement of the stirrups relative to the shaft when actuated for braking, said restraining means including:

a cap having an aperture, said wrench engaging means being accessible through said aperture, said cap being mounted at the free end of said shaft, and being formed with a projection, said restraining means further including a recess, said projection being tightly disposed in said recess for restraining said cap on said shaft, and arranged so that at least a portion of said restraining means is restrained from rotation with respect to said cap, whereby said cap is substantially restrained from being shaken loose from said shaft when said brake assembly is vibrated.

2. The caliper brake according to claim 1, wherein said shaft is threaded and said retaining means further comprises a first nut threadable on said shaft, and a second nut threadable onto said shaft for restraining said first nut from axial movement on said shaft.

3. The caliper brake according to claim 2, wherein said cap composed of synthetic plastic material.

4. The caliper brake according to claim 1, said retaining means further comprising a collar connected to said shaft and formed with a groove and a spring mounted in said groove for forcing said stirrups apart from one another, to clear the wheel rim when the brake is not applied.

5. The caliper brake, as claimed in claim 1, said wrench engaging means includes a multi-faceted prismatic shape.

6. The caliper brake, as recited in claim 1, wherein said restraining means comprises a supporting disk mounted on said shaft having a plurality of recesses on the periphery thereof, said cap being formed with projections for engaging at least some of said recesses thereby to keep the cap on the shaft.

7. The caliper brake as recited in claim 6, wherein said cap has a recess for receiving first and second nuts, said wrench engaging means and a supporting disk.

8. In a caliper brake for use in connection with a bicycle having a frame and including a rimmed wheel journalled with relation to said frame, a brake assembly comprising, in combination:

a longitudinal shaft mountable on said frame, at least a portion of said shaft including a free shaft end being rotatable about the longitudinal shaft axis, said shaft having wrench engaging means in the form of a multi-faceted prismatic portion at said free end accessible from the exterior, two brake stirrups pivotably mounted in the vicinity of each other on said portion of said shaft, normally occupying an angularly spaced position apart from each other sufficiently to clear the wheel when the brake is not applied, actuatable to move angularly toward each other about the shaft axis for braking, and exerting pressure against the shaft portion sufficient to generate frictional interengagement between the stirrups and the shaft portion for substantially symmetrical positioning of the stirrups relative to the rimmed wheel when the shaft portion is rotated, a first nut threadable onto said shaft, a second nut threadable onto said shaft for restraining said first nut, a collar unitary with said shaft for restraining one side of said brake stirrups from axial movement in a direction away from said nuts, said collar being formed with a groove, and a spring mounted in said groove for forcing said stirrups apart from one another to said spaced apart position, a cap having an aperture, said wrench engaging means being accessible through said aperture, said cap being made of synthetic plastic material, being formed with projections,, and a supporting disk mounted on said shaft for frictionally engaging the other side of said brake stirrups, said supporting disk having a plurality of recesses on the periphery thereof, said cap projections engaging at least some of said recesses for restraining said supporting disk from rotation with respect to said cap, said supporting disk and said nuts fitting tightly into the cap recess, whereby said cap is substantially restrained from being shaken loose from said shaft when said brake assembly is vibrated.

* * * * *